United States Patent
Buchanan, Jr.

(10) Patent No.: US 6,803,008 B2
(45) Date of Patent: Oct. 12, 2004

(54) METHOD OF APPLYING A RESIN-RICH SKIN ON THE SURFACE OF REINFORCED MATERIAL GEAR OR OTHER WEAR SURFACE

(75) Inventor: Harry Charles Buchanan, Jr., Centerville, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 149 days.

(21) Appl. No.: 10/013,554

(22) Filed: Dec. 11, 2001

(65) Prior Publication Data

US 2003/0107157 A1 Jun. 12, 2003

(51) Int. Cl.[7] .............................................. B29C 45/14
(52) U.S. Cl. ...................................... 264/259; 264/279
(58) Field of Search ............................... 264/259, 279, 264/438

(56) References Cited

U.S. PATENT DOCUMENTS

| | | | |
|---|---|---|---|
| 4,681,712 A | 7/1987 | Sakakiara et al. | 264/24 |
| 5,354,532 A | 10/1994 | Nakai et al. | 264/259 |
| 5,587,209 A | 12/1996 | Soga et al. | 427/503 |
| 5,908,671 A | 6/1999 | Tanaka et al. | 427/535 |
| 6,086,810 A | 7/2000 | Inagaki et al. | 264/266 |
| 6,492,000 B1 * | 12/2002 | Matsuki et al. | 428/124 |

FOREIGN PATENT DOCUMENTS

| | | |
|---|---|---|
| DE | 42 08 276 A1 | 9/1993 |
| DE | 101 19 235 A1 | 10/2001 |
| EP | 0 739 706 A2 | 10/1996 |
| EP | 0 1896 869 A1 | 2/1999 |
| EP | 0 980 746 A1 | 2/2000 |
| GB | 2 300 587 A | 11/1996 |
| JP | 62-095209 | 5/1987 |

OTHER PUBLICATIONS

A copy of the International Search Report dated May 2, 2003 is enclosed.

* cited by examiner

Primary Examiner—Michael P. Colaianni
Assistant Examiner—Monica A. Fontaine
(74) Attorney, Agent, or Firm—J. Gordon Lewis

(57) ABSTRACT

This invention provides a method of applying a coating of a resin-rich material to a substrate to produce a molded device. The method involves installing a layer of the resin-rich material over a mold die and adding a molten substrate to melt the resin-rich layer and filling the mold. The mold is cooled and a molded device with a surface containing the resin-rich layer is formed.

24 Claims, 3 Drawing Sheets

METHOD OF APPLYING A RESIN-RICH SKIN ON THE SURFACE OF REINFORCED MATERIAL GEAR OR OTHER WEAR SURFACE

FIELD OF THE INVENTION

This invention relates to a method of reinforcing gears and various other parts having surfaces with complex geometries which are subject to wear. More particularly, this invention relates to a method for producing a reinforced part having a resin-rich skin applied to selected wear surfaces to provide increased lubricity and/or extended use. This invention also pertains to a method for providing a working part such as a gear having a resin-rich skin integrally attached thereto such that the resin-rich skin overlies the wear surface of the resulting part. This present invention is also directed to parts made of a reinforced material, such as gears having a resin-rich coating integrally bonded thereon.

BACKGROUND OF THE INVENTION

In devices such as automotive vehicles, numerous subassemblies require the use of moving parts which must have durable wear surfaces in order to provide failure-free function for prolonged periods up to and including the useful life of the associated automotive vehicle. It is also desirable to have the moving parts in the automotive subassemblies weigh as little as possible to reduce overall vehicle weight. Hence many moving parts with exposed wear surfaces are manufactured from polymeric materials where possible.

Polymeric parts can have drawbacks. Materials such as acetals exhibit good lubricity and wear resistance but can be inappropriate for use in intricate parts such as gears and the like. Parts manufactured from polymers such as acetals can exhibit creep and deformation when left under load. Additionally, polymeric materials such as acetals can shear under the load stresses possible in the subassembly environment. It can be appreciated that even small amounts of creep or shear can compromise the functionality of the gear or other part. Even small deviations or deformities in the geometry of the part can result in deviations beyond commonly accepted tolerances with deleterious results on the associated subassembly.

To mitigate this problem, parts with close tolerances or other dimensional criticalities can be manufactured from filled or reinforced polymeric materials. Reinforced polymers generally contain suitable fibrous or particulate reinforcement material such as glass, carbon fibers or the like. Use of acetal or other polymers reinforced with a suitable material such as glass fibers or the like has been proposed. Unfortunately, reinforcement does not address all problems inherent with such parts and presents additional problems when used.

Reinforced polymers exhibit increased coefficients of friction at the surface of the manufactured part. In parts such as worm gears and the like, increases in coefficients of friction can translate into increased surface wear and premature part failure. Thus, it is highly desirable that the material of construction be one which will provide a lubricious wear surface at the point of contact between the polymeric part and any mating member.

Attempts have been made to construct parts composed of reinforced polymeric material which have critical contact surfaces characterized by increase lubricity. Unfortunately, parts so constructed are prone to premature surface wear due to any of a number of failure phenomena including but not limited to shear separation and/or erosion. Eventually the underlying reinforced material is exposed with all of the problems attendant thereto.

Thus it would be desirable to provide a part having a body which could be advantageously constructed from reinforced polymeric material. It is also desirable that such a part have a suitable lubricous outer wear surface integrally connected to the reinforcing material to provide lubricity and suitable protection from excessive wear which can occur when mating parts come into contact with the polymeric part of the present invention. It is desirable that this reinforcing lubricious surface be located at discrete regions of the part as required. It is also desirable that the resulting polymeric part have any number of irregular geometric surfaces with an essentially uniform layer of lubricious polymeric coating overlying the irregularities as required or desired. Finally, it is also desirable to provide a method whereby such parts could be economically and predictably be made.

SUMMARY OF THE INVENTION

The invention provides a method of producing a part integrating a layer of a resin-rich material to a substrate in a process that produces a molded device. Such molded device or part would be suitable for use as a part in various high-wear environments such as mechanical subassemblies.

In the method of the present invention a film of resin-rich material is installed within a mold die. A volume of substrate is then introduced into the mold die in a molten state, preferably at a temperature above the melting point of the resin-rich material. The volume of molten substrate is introduced into the mold die under pressure through injection gates or orifices. The volume introduced has sufficient heat to melt the resin-rich film and to permit the substrate to remain molten long enough to deform the melted resin-rich material against the inner surface of the mold die. Introduction of the molten substrate occurs at a location and in a manner such that the resinous material is interposed between the inner surface of the mold die and the introduced molten substrate. The materials are then allowed to cool to solidify into the molded device. The resulting device possesses a relatively uniform resin-rich layer in a contoured, integrally-bonded relationship to the molded substrate.

The resin-rich material can be positioned in the mold die by any suitable means. If desired or required, the resin-rich material can be installed into mold die as a sheet. The resin-rich material can be preheated to a temperature below its melting and/or deformation point prior to introduction of the substrate material to the mold die. Alternately, the resin-rich material can be installed by deposition in preliminary contact with the internal surface of the mold die by a suitable deposition process. Examples of suitable processes include electrostatic deposition where suitably charged polymeric particles are electrostatically affixed to the mold surface. It is also within the purview of this invention to install the resinous material in the mold device by spraying melted or semi-melted particles of the resin-rich polymeric material onto the surface of the die mold with the surface being held at a temperature sufficient to permit the material to initially adhere and solidify on the surface. The mold die can then be filled with a molten substrate at a temperature sufficient to cause the particles to melt (or re-melt) in a manner that achieves integral boding of the resinous material to the introduced substrate material. The level of bonding achieved is to a degree greater than initial adhesion to the die mold surface, and solidifies the substrate such that the polymeric material bonds with the substrate.

BRIEF DESCRIPTION OF THE DRAWINGS

The objects, features and advantages of the present invention will become more readily apparent from the following description, reference being made to the following drawing in which the Figure is a sectional view through a piece of tubing of the present invention.

DETAILED DESCRIPTION OF THE PREFERRED EMBODIMENTS

Figure 1:
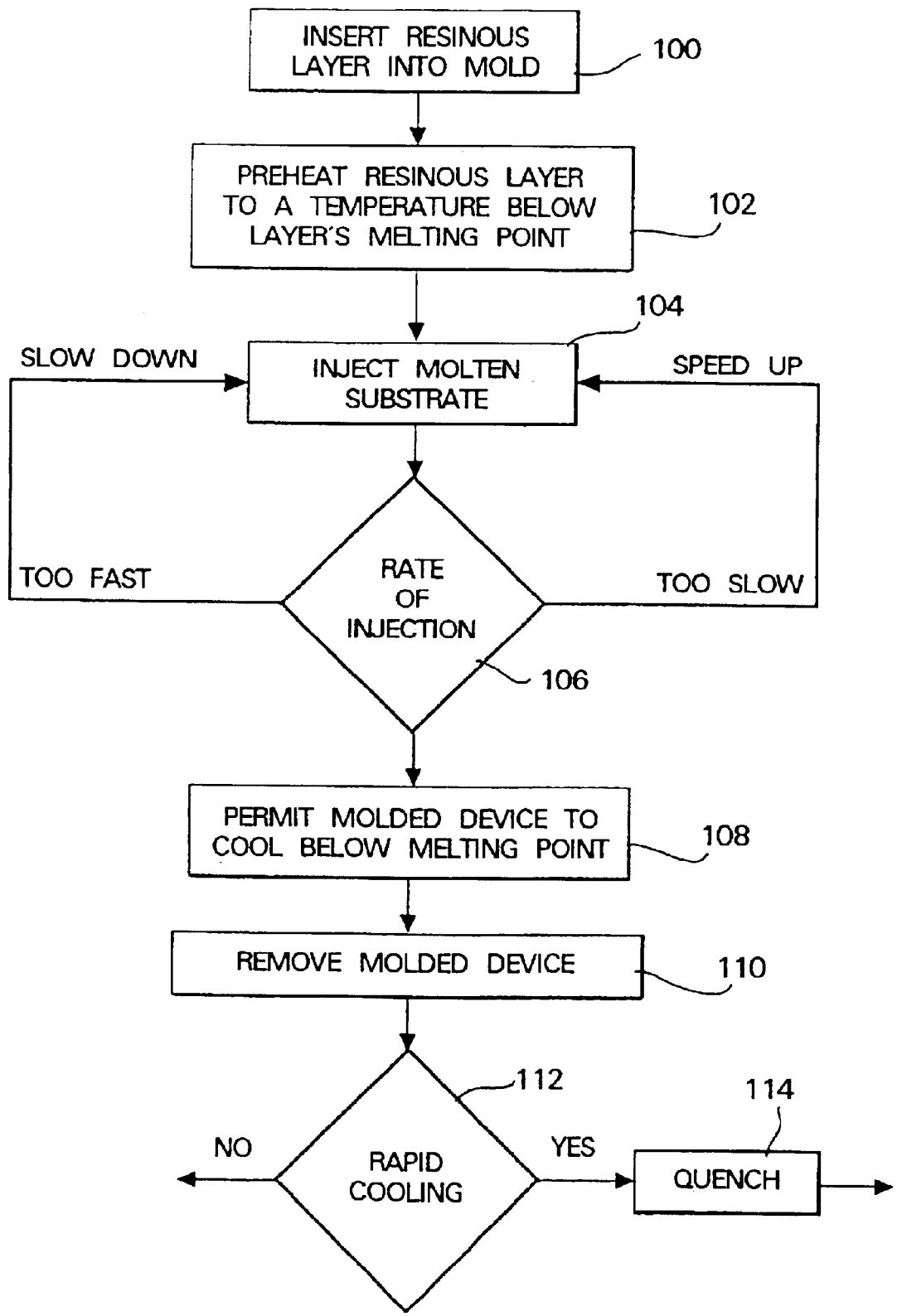
FIG. 1 is a process flow diagram for molding a device with a resinous skin bonded to the surface of the molded device.

The present invention provides a novel method of producing a molded substrate with reinforcement in critical regions and precise regions of increased wear resistance and/or lubricity. Such molded parts may be, for example, a gear sprocket.

This invention is predicated on the unexpected discovery that durable, essentially permanent bonding can be achieved between a resin-rich film and an injectable molding material when a relatively thin sheet of the resin-rich film material is interposed between an interior surface of a mold die and the injectable material introduced during the molding process. Furthermore, the present invention is predicated on the discovery that the resin-rich material in the interposed film will withstand the heat and pressure which exist in the mold during and after the introduction of the injectable molding material in a manner sufficient to impart a polymeric overlayer on the outer surface of the molded part.

Heretofore, it was believe that a suitable bond could not be obtained between a film of resin-rich material and an injectable molding material introduced into a mold die. It was widely believed that the injection process would result in unacceptable decomposition of the resin-rich material due to excess localized heat produced by the injected material and experienced by the thin film of resin-rich material. It was also believed that the resin-rich material would experience inappropriate deformation forces due to the introduction of the injectable moldable material into the associated mold cavity. The resulting film would be crumbled or folded or would demonstrate incursion of the injection molding material over the resin-rich film.

It has been found quite unexpectedly that under the injection molding conditions of the present invention, an essentially uniform layer of resin-rich material can be imparted onto the surface of a resulting molded part even in situations where the surface to be so treated has an uneven or irregular geometry. Furthermore, it has been found that the bond or junction between the underlying molded material and the polymeric layer imparted thereon is essentially permanent, uniform and highly resistant to delamination or shear. Finally, it has been found that parts prepared by the process of the present invention exhibit a polymeric layer characterized by an essentially uniform depth in spite of irregularities or complexities in the surface of the geometry of the part.

In the process of the present invention, the substrate material selected for the body of the molded part may be any suitable injectable, moldable material. As used herein the term "substrate" is defined as a material which can be processed by injection molding process, can be introduced into a mold die in a molten or semi-molten state and can serve as an underlying body to the part as a whole. The substrate material can possess suitable inherent dimensional strength and stability or can include suitable reinforcing material to provide suitable dimensional strength and stability. The material of choice is one which, upon introduction to the appropriate mold die under conditions of the method of the present invention, transforms a suitable film of resin-rich material positioned therein to a state capable of deformation against the contours of the inner surface of the mold die and adhesion to the introduced substrate material.

The term "resin-rich material" as used herein refers to any material, polymeric or otherwise, that is suitable for use as a wear surface and provides good lubricity to the finished part. The resin-rich material may be in the form of a sheet, or a layer of particles forming a continuous but uncongealed mass. The polymeric material may be similar or identical to the material employed in the substrate material but typically lacks reinforcing additives such as fibers and the like.

As used herein, the term "substrate material" is defined as injection moldable material which can be employed in the body portion of the part. The material may be chemically similar to the resin-rich material employed in the thin film; i.e. the material may be a polymeric material having reinforcing additives such as glass or the like. Alternately, the material may be a dissimilar material such as a moldable metal, other polymeric material or the like.

In the process of the present invention, the substrate material of choice will be one having a melt temperature in a range sufficient to maintain the chemical and dimensional integrity of the installed resin-rich film during the injection and molding process. This melt temperature range will vary depending on the resinous material employed in the layer, the amount of heat transfer obtained in the and through the mold itself, and the ability of the injection moldable material to transfer heat under molding conditions. Generally, the melt temperature of the molten substrate which can successfully be employed in the process of the present invention is between about 200° and about 300° C. Suitable materials are those which are generally processable at temperatures between 205° C. and 225° C., with processing at temperatures between 215° C. and 225° C. being preferred.

In the process and device of the present invention, the melt temperatures of the resin-rich material of choice and the melt temperature of the molten substrate material should not be too disparate, such as on the order of no more than 0° C. to 50° C. difference between the two materials with a difference between 0° C. and 100° C. being preferred. It has been found that melt temperature differentials within these defined ranges achieve successful integration of the two materials during the molding process of the present invention.

In the method of the present invention, the resin-rich material that forms the resin-rich skin/reinforcing overlay is installed in the mold die prior to introduction of a substrate material. Preferably, the resin-rich material will be installed upon or positioned adjacent to contours defined in the inner surface of the mold die. The contours of interest are those resulting in areas of increased wear or friction in the finished molded part.

In the process of the present invention, the resin-rich material is positioned in the mold die such that the resin-rich film is interposed between the inner surface of the mold die and the orifice through which the molten substrate is introduced into the mold die interior.

The resin-rich material to be installed may exist in any manner which will permit and facilitate the desired installation of the resin-rich material. The resin-rich material may be installed as a thin film inside or overlaying the interior mold surface. Alternately, the resin-rich material may be installed as a particulate material that adheres to the interior surface of the mold die at the desired location or locations.

Where the resin-rich material is installed as a film, the film employed may be a suitably dimensioned sheet which is either manually or automatically oriented and positioned in the interior cavity of the mold die. Where particulate material is employed, the resin-rich material can be introduced and positioned on the surface of the mold die by means of a suitable particulate deposition method.

Once resin-rich material is installed, substrate material is added to the mold die interior. The substrate material is added at a rate, temperature, and volume such that the resin-rich material is melted by the substrate and deformed against the interior of the mold as necessary. In the process of the present invention, the substrate material is added to the mold die is at a temperature above melting point of the resin-rich film. The introduced substrate material contains sufficient initial heat upon introduction to permit the substrate material to cool to a second lower temperature still above melting point of the resin-rich material and to impart sufficient heat to the resin-rich material to raise the resin the temperature of the resin-rich material above the melting point of the resin-rich material and to exceed the latent heat of fusion of the resin-rich material before solidification of the molded part commences. Once contact and fusion of the resin-rich material with the substrate material occurs, the resin-rich material and the substrate material will begin to cool with the transfer of heat through the surfaces of the mold die.

In the process of the present invention, the substrate material employed is introduced in a molten state. As used herein the term "molten state" of the material is defined as a temperature above the melting point of the substrate material such that the substrate material is a fluid or flowable material when introduced into the mold die. By "fluid" or "flowable" it is meant that the substrate material is capable of introduction into the mold die cavity by suitable injection molding processes.

Melting of the resin-rich film for integration and/or bonding to the introduced substrate material occurs or is triggered by the introduction of the substrate. In the process of the present invention, the resin-rich material will melt when the rate of heat transferred to the resin-rich material exceeds the rate of heat being conducted out of the resin-rich material through the mold die body taken together with the point at which the amount of the heat absorbed by the resin-rich material exceeds the latent heat of the substrate material at the melting point of the substrate material.

The heat transport phenomenon induced by the process of the present invention can be expressed as energy and can be determined from the following energy equation:

$$Pe(\partial T/\partial t + u \cdot \nabla T) = \nabla^2 T + S; \quad (I)$$

where the properties of the materials are accounted for in the Peclet number, Pe; the latent heats of fusion are accounted for in the source term, S; and T, t, and u are non-dimensionalized values of the temperature, time and velocity respectively. Thus one can determine process times and temperatures based on a given material's properties.

In the process of the present invention, heat introduced through the molten substrate is balanced with the rate of heat transferred through the resin-rich material and into the mold die. It has been found, quite unexpectedly, that heat transfer occurs at such a rapid rate that there is no appreciable thermal degradation of the resin-rich material. Without being bound to any theory, it is hypothesized that contact between the resin-rich material and the introduced substrate material is sufficiently instantaneous such that a resin-rich skin is produced which that overlies and adheres to the substrate in an essentially uniform manner. By "essentially uniform manner" it is meant that the resin-rich skin which is imparted on the substrate has an essentially uniform overlay essentially devoid of all patches or holes exposing the underlying substrate. Furthermore, the resin-rich skin imparted is characterized by an essentially uniform thickness. As used herein, the term "essentially uniform thickness" is defined as a thickness providing sufficient lubricity and/or protection during the desired life span of the resulting part.

In the process of the present invention, the heat given up by the molten substrate material must be greater than the heat taken up by the resin-rich material before being removed from the mold. Expressed arithmetically, the heat given up by the molten substrate equals [mass of molten substrate material]*[specific heat]*[change in temp. of molten substrate material]. This value must be greater than the heat taken up by the resin-rich material, which equals [mass of resin-rich material]*[specific heat of resin-rich material] *[change in temp of layer of resin-rich material]+[mass of layer of resin-rich material]*[latent heat of fusion of resin-rich material in the layer], before the resulting part is removed from the mold.

Generally speaking, the thermal mass of the molten substrate material employed in the process of the present invention is greater than the energy necessary to melt the resin-rich material. In the preferred embodiment at a minimum, the outer region of the molten substrate material introduced in the mold die has sufficient thermal mass to melt the resin-rich material as the two materials come into contact with one another.

The thermal conductivity of the resin-rich material is sufficiently low that the temperature of the resin-rich material will rise above its melting point and sufficient heat will be retained by the resin-rich material before the heat is transferred out of the resin-rich material to the mold die. Additionally, in the process of the present invention, the temperature of the molten substrate material is above the melting point of the resin-rich material. The molten substrate material possesses sufficient heat to remain above the target melting point until the resin-rich material has melted. Without being bound to any theory, it is believed that balance of these factors permits intermingling of the resin-rich material and the introduced substrate material at the interface of the two layers. This intermingling on the molecular or near-molecular level results in an interface region characterized by the graduated presence of both materials in a fashion promoting the bonding of the two associated layers to one another. This region may be characterized by a mechanical bonding process, a chemical bonding process or a mixture of these two bonding phenomena. It is also theorized that the process of melting the two materials with the subsequent essentially simultaneous resolidification of the two materials creates a region of adhesion unique to the process of the present invention.

The substrate material of choice will be one that provides necessary qualities of durability, strength and weight to the finished part in addition to conforming to the parameters defined by the Equation I presented above. It is within the purview of the process of the present invention that metal and metal composite materials can be used as the substrate material in the formation of parts having a resin-rich polymeric skin according to the process of the present invention provided that necessary properties such as injection temperature and heat transfer are within acceptable defined ranges. Generally speaking, the metal or metal composite employed as the substrate material of the present invention must melt at a relatively low temperature, preferably below about 400° C. The preferred material for use as the substrate material in the process of the present invention is a suitable injection moldable polymeric material, such as thermoplastics and thermoplastic composites.

The substrate material of choice, whether metal, metal composite or polymeric material, will be one which can flow readily and rapidly into the space defined by the mold die. The flow rate and the rate of mold fill will interpose the suitably positioned resin-rich material between and in contact with both the introduced substrate material and the mold surface upon completion of the introduction step. Generally the rate at which the substrate material is introduced into the mold die is one which will permit the deformation of the suitably positioned resin-rich material into intimate essentially continuous contact with the interior surface of the mold die without undue infiltration of the introduced substrate material between the resin-rich layer and the inner surface of the mold die.

It is preferred that the substrate material be introduced at a rate and in a manner which does not induce undue turbulence or shear as the material is injected. Without being bound to any theory, it is believed that excessively rapid introduction rates can result in undesirable infiltration of the molten substrate between the resinous layer and the surface of the mold. This can result to in uneven or incorrect coverage of the resinous layer in the finished product. Similarly excessively slow rates of introduction can result in poor physical characteristics in the resulting molded part. This may be due in part to transfer of heat to the resin-rich layer on the mold before contact with the molten substrate which causes the resin-rich layer to melt and flow before encapsulation occurs between the substrate material and the surface of the mold die. The flow rates are therefore bounded by a lower limit determined by the rate of heat transfer across any gap existing between the resin-rich material layer and the molten substrate material that permits the resin-rich layer to prematurely melt before the molten substrate material comes into contact with it. The flow rate is bounded by an upper limit which would result in undue mixing between the resin-rich layer with the molten substrate material. The lower limit is determined by the time it takes to heat the layer of resin-rich material to its melting point from the heat emanating from the molten substrate material. The upper limit on the rate of injection of molten substrate material will be determined as a flow rate that evidences an onset of turbulence.

In the process of the present invention, a computation of the Reynold's number of the given molten substrate material during injection can be used to determine the maximum rate of injection. The Reynolds's number is a ratio of inertial forces to viscous forces. When inertial forces are great enough the material experiences the onset of turbulent mixing. Turbulent mixing particularly increases the rate of mixing of fluids in high shear regions. Nominally, the onset of turbulence begins at Reynolds numbers greater than 2000. This value is largely dependent on various conditions including the geometry of the injection port and its particular surface characteristics as well as the expansion phenomena as the molten substrate material enters into the die mold. Maximum flow rates for a given fluid is demonstrated by the process control of FIG. 1, which will now be discussed in detail as part of the overall process of the present invention.

In the process of the present invention as schematically outlined in FIG. 1, a resin-rich material layer is installed in the mold in initial step 100. The resin-rich material layer may be a film or sheet positioned within the desired mold die, or may be a layer formed by the spray application of resin-rich particulate or plasma material onto the interior surface or desired portions of the interior surface of the mold die by a suitable deposition procedure such as electrostatic deposition or similar deposition process, hot melt spray deposition or the like. Particles may be deposited either by electrostatic means or by the spraying of hot molten particles onto a cooled mold die surface. After the installation step of the process of the present invention, the resin-rich material layer may, optionally, be preheated to a temperature below the melting point of the resin-rich material 102. This can be done to promote moldability of the resin-rich material during subsequent steps and to assure that the desired conformance to the contours of the interior surface of the mold die occurs during subsequent introduction of the substrate material. Without being bound to any theory, it is believed that the preheating step also results in a better, more consistent and uniform connection between the two materials.

In the process of the present invention, it is contemplated that the optional preheating step can be accomplished with the mold die either opened or closed. However prior to introduction of the molten substrate material, the mold die is closed. A molten substrate material is introduced into the mold die 104 through a suitable orifice or orifices (not shown). The orifice (or orifices) through which the substrate material is introduced is positioned relative to the interior mold die cavity so that the resin-rich material installed in the interior cavity defined in the mold die is interposed between the interior surface of the mold die and the orifice through which the molten substrate material is introduced. In this way the introduction of the molten substrate material acts to force the resin-rich material into compressed contact with the interior surface of the mold die.

The installed resin-rich material is positioned in the mold die in a manner which will provide an essentially uniform layer of resin-rich material in overlaying relationship on the desired outer wear surface of the part thus produced. The rate of introduction and molten substrate flow rate once in the mold are such that the introduced molten substrate material does not creep or flow between the resin-rich layer and the mold surface. While not being bound to any particular theory, it is believed that the preferred flow rates at introduction combined with the relative thin nature of the resin-rich material employed work to prevent incursion of the molten substrate, a fluid melt-processible thermoplastic material, between the resinous layer and the mold surface thus producing a part with an essentially uniform defect-free wear surface.

In the process of the present invention the molten substrate material is introduced by injection into the mold die cavity. Injection can be accomplished by any suitable injection device as would be known to one skilled in the art.

The molten substrate material is introduced into the mold die cavity at a rate suitable to permit the integration of the resin-rich material as a skin on the surface of the substrate material. In thee process of the present invention, the injection rate is regulated by monitoring molten substrate material flow rate 106. If desired the process of the present invention can include optional substeps for adjusting and modifying the substrate flow rate to regulate adhesion between the two materials. The rate of injection is preferably one that will allow heat to be conducted to and through the resin-rich material layer as the result of internal thermal radiation from substrate to resin-rich material layer in an essentially direct manner. Thermal radiation is operative as a factor in the process of the present invention through a wide range of process temperatures beginning at approximately 200° C. Generally the rate of injection will be one that will maximize injection efficiency while acheiving the desired ends. Typically the injection rate will be between 1.5 inches per second and 2.0 inches per second with rates at the higher end of the range being preferred.

It is to be understood that the present invention is predicated on the discovery that the rate of injection controls and effects the formation of the bond between layer and substrate and the quality and functionality of the resin-rich layer to be imparted. An injection rate below the desired norm can result in too much heat being transferred to the resin-rich layer before the molten substrate material comes into effective contact with the molten substrate material. In injection rates below the effective minimum, heat conducted through gas present in the mold die cavity becomes a factor in the heat experienced by and conducted to the resin-rich material layer during the molding process. Thus heat conduction through gas becomes a significant factor approaching or exceeding the effect of internal thermal radiation on the molding and bonding process.

If the rate of injection is too fast, the injection is determined from the material properties of the resin-rich material layer and the molten substrate material that turbulent fluid flow has been initiated. Turbulent fluid flow can result in high shear in the regions of the turbulence, producing turbulent mixing. Typically high shear regions will be located at the regions proximate to the interior walls of the mold die device where the resin-rich material layer is located. If the resin-rich material layer, already in a melted or semi-melted state, is subjected to turbulent mixing, the resin-rich material layer may be mixed with the introduced substrate material. This can result in an uneven resin-rich layer with regions of significant thinning. Alternatively, high turbulence can prevent the formation of regions of consistent essentially undisturbed cooling and solidification which are believed to be necessary to produce integral bonding. For these reasons, the process of the present invention can include optional iterative substeps directed to the adjustment of the rate of injection to a point between the initialization of turbulent flow and the production of heat conductance through gas.

After the mold die is filled with the molten substrate material, the molded device is permitted to cool 108. When the molded device is in a substantially solid form, the device is removed 110 from the mold die. For purposes of this invention, the device is substantially solid if the external layer of the molded device is sufficiently rigid to maintain the shape and integrity of the molded device upon removal from the mold die. If rapid cooling 112 is desired, the removed molded device can be quenched 114 or subjected to other post treatment cooling and processing steps (not shown).

The molten substrate material of choice for the major portion of the part of the present invention is one that will provide dimensional stability and durability along with reduced weight in the part in which it is employed. Suitable polymeric substrate materials preferably are selected from the group including polyamides, acetal resins, injection moldable thermoplastic elastomers, polyetherimides, and mixtures thereof. The substrate material may contain suitable reinforcement additives such as glass, carbon fibers, metal fibers, and the like. The amount of reinforcement additive is generally determined by the end use application. However, it is anticipated that materials containing up to about 30% by weight reinforcement additive may be used in the process of the present invention, with amounts between 5 and 30% by weight being preferred and amounts between 5 and 20% being most preferred. It is also within the purview of this invention to provide additives which provide other efficacious attributes such as lubricity and the like. Such materials may also provide an advantageous increase in strength and the like. Suitable materials include materials such as TEFLON, KEVLAR, silicone-based polymers and the like.

While it is preferred that the molten substrate material employed in the process of the present invention be a thermoplastic polymeric material, it is to be understood that other materials and composites may also be employed as the injection moldable material of choice within the contemplated purview of this invention. Such materials are to be considered encompassed within the scope of this invention provided heat transfer parameters defined in Equation I are met.

The resin-rich material layer that results in a resin-rich polymeric skin overlying crucial regions of the exterior surface of the associated part is composed of a suitable polymeric material capable of deformation when exposed to a suitable level of heat such as that which is introduced upon injection of the molten substrate material in the process of the present invention. The resin-rich skin may be of any suitable thermoplastic or thermosetting material or a mixture of such materials. It is preferred that the material be composed of a thermoplastic polymeric material as these materials have the ability to pass into a molten or semi-molten state and to resolidify without appreciable loss of physical or performance characteristics. Suitable thermoplastic materials include those from the group including acetal resins, fluorocarbon/acetal blends, ethylene polymers, and polyether elastomers. It is within the purview that the resinous layer be at least partially composed of thermosetting materials either alone or in combination with the thermoplastic materials previously defined. Thermosetting materials that can be employed in the process of the present invention preferably exhibit at least some increase in plasticity when exposed to the elevated temperatures induced upon introduction of the molten substrate. When such thermosetting materials are used, it is preferable to employ polymers with a reduced level of possible cross-linkage sites. Suitable materials could be ones capable of additional heat-catalyzed cross linkage with the heat derived from introduction of the molten or semi-molten injectable moldable material.

The material employed in the resin-rich skin may be a polymeric material not typically processible by injection methods. Thus, materials such as high density polyolefins, such as high density polyethylene, may be successfully integrated into injection molded parts.

The resin-rich material layer in the process of the present invention has an initial thickness sufficient to result in a functional resin-rich skin integrally bonded to the surface of the finished molded part. Generally the resin-rich material layer will have an initial thickness sufficient to impart the resin-rich overlay but will be sufficiently thin so as to permit rapid, essentially instantaneous transition into a pliable molten state upon heating. The pliable molten state which is achieved is one which will permit the resin-rich material layer to deform upon contact with the molten substrate and to conform with the corresponding interior surface of the mold die cavity. In the process of deformation, the resin-rich material may experience some thinning as it expands and comes into contact with the inner surface of the mold die. Thus the initial thickness of the resin-rich material layer will be such that the material will have sufficient dimensional stability and depth upon expansion. Generally, a thickness between 0.005 inch and 0.025 inch is desired with a thickness between 0.005 inch and 0.015 inch being preferred.

One unexpected result of the process of the present invention is that the expansion or thinning of the resin-rich material layer under deformation occurs in an essentially uniform manner. This results in an essentially uniform polymeric skin in integral overlying relationship to the associated body of the resulting molded part. This uniformity in depth was quite unexpected. The uniformity is particularly advantageous and desirable in molded parts having complex or irregular geometries such as gear surfaces and the like. Heretofore, application of any type of polymeric overcoating has resulted in irregular layer thicknesses. Such molded parts generally have areas of greater thickness in depressions between gear teeth and thinner areas or voids in elevated areas. This has an adverse effect on part wear and the like. Furthermore, such irregularities can cause the part to deviate from tolerances.

It was initially believed that use of polymeric film sheets in the molding process of the present invention would produce undesirable surface irregularities. Surprisingly, more uniform overlay of the resin-rich polymeric skin has been obtained by the process of the present invention than was initially expected. Without being bound to any theory, it is believed that this uniformity is due to the rapid melting of the resin-rich skin, the rapid expansion of the resin-rich layer and molten substrate over the mold surface, and the subsequent rapid and simultaneous cooling to solidify the substrate with the resin-rich material.

It has also been found that the method of the present invention can be used to formulate parts having resin-rich skins that are composed of essentially dissimilar materials, i.e. materials having very disparate melt temperatures. Heretofore, it was widely held that the injectable moldable material employed in the body of the part had to have a similar melt processing temperature to that of the any polymeric material interposed in the mold if the two were to be successfully bonded during a molding process. Extreme dissimilarities could not be successfully processed. If the injection temperature of the molten substrate was too high relative to the polymeric sheet, it was widely believed that the polymeric sheet would decompose and/or oxidize to a non-functional material. It was quite unexpected, but this phenomenon does not appear to occur with the process of the present invention. Without being bound to any theory, it is believed that the rapid introduction of the molten substrate into the mold cavity creates a situation where any oxygen initially present is rapidly consumed without any significant deleterious oxidative effect on the resin-rich material. This creates an essentially non-oxidative atmosphere in the mold cavity as the materials cool and resolidify, increasing bond integration.

Equally as transient is the interval of extreme excess heat to which the resinous layer is exposed. Once the molten substrate is introduced into the mold cavity, the mass of the mold and surrounding mold components act as a heat sink for excess heat latent in the molten substrate. Excess heat is rapidly conducted away through the mold and any intervening resin-rich material to produce rapid cooling of the substrate to temperatures below the decomposition temperature of the resin-rich film. In this way, the process of the present invention provides a means for mold processing any number of materials with otherwise non-compatible process temperatures. Enhanced temperature control can be provided with cooling systems affixed to the mold, such as cooling tubes, or external fins to facilitate heat removal. By this means, the rate of heat removal can be slowed for a particular combination of resinous layer and molten insulation substrate. Either insulation or heating the mold can also be provided.

In the process of the present invention, the resin-rich material layer may be derived from straight sheet stock. In applications such as gear and other parts with essentially cylindrical surfaces, it is also possible to employ tubes of material which will interpose as a single layer over the exterior of the part. Use of such tubular material will be described in detail subsequently.

The resin-rich material layer employed in the process of the present invention generally has a thickness between 0.005 inch and 0.025 inch, with a thickness between 0.005 inch and about 0.015 inch being preferred. It is to be understood that the thickness of the resin-rich film can vary from particular application to application. Factors which can affect the choice of thickness include but are not limited to physical characteristics of the polymeric material and its ability to be processed effectively and held in a suitable state of thermal and physical equilibrium by the mold into which it is inserted and processed. Choice of thickness can also be affected by the expected rate of expansion of the resin-rich layer into mold irregularities such as gear teeth or other mold geometries. Specifically, the resin-rich film is able to enter a formable molten state and effectively convey excess heat into the body of the mold die, thereby minimizing the opportunity for thermal decomposition. The resin-rich material layer is also capable of being formed against the inner mold surface. The thickness of the resin-rich layer formed against the mold surface can vary within the parameters specified depending upon factors such as the geometry of the mold surface and the like.

In the method of the present invention, a moldable resin-rich material layer is installed into a mold die having a configuration which will provide a finished part the desired geometry. The mold die in question may have any desired configuration capable of permitting injection of a molten substrate material which will compose the body of the molded part. The mold die will, preferably, be one which is capable of producing a finished molded part of suitable size and dimensional accuracy. The mold die will also have suitable mass so as to act as a heat transfer medium for rapid removal of heat from the molten substrate material introduced therein during the molding process. Generally, the mold is a two-part or multi-part die with at least one injection opening or port permitting the ready introduction of the molten or semi-molten thermoplastic material.

The two-part or multi-part die also is configured to permit the proper placement of the desired resin-rich material layer relative to the inner surfaces of the mold. It is also within the purview of this invention that the mold be capable of being heated to a suitable intermediate temperature to facilitate appropriate introduction of the molten substrate material and/or the preconditioning of the resin-rich material so as to facilitate the deformation of the resin-rich layer upon introduction of the thermoplastic molding material.

If the mold is preheated, the temperature of the mold is maintained at an elevated temperature sufficient to facilitate introduction of the molten substrate material but low enough to permit transfer of sufficient latent heat from the introduced molten substrate material in a prompt manner. Generally, the mold is maintained at a temperature between about ambient or room temperature and a temperature below the melting point of the material employed in the resin-rich material layer. Typically, the mold temperature is between ambient at its lower limit and a temperature less that 100° C. below the melt temperature of the resin-rich material. Preferably, the temperature of the mold is maintained between about 55° C. and about 50° C. below the temperature at which the resin-rich material layer melts. Without being bound to any theory, it is believed that the temperature differential between the mold temperature and the temperature at which the molten substrate introduced permits the very rapid transfer of heat from the molten substrate to the body of the mold. This temperature differential is particularly efficacious when the resin-rich material installed in the mold die is in the form of a sheet, film or particle deposition.

It is also within the purview of this invention to use a granulated or particulate form of the resin-rich material during the installation step. In such instances, the mold die may be configured with heating devices that will permit and promote the temporary adhesion of the granular material to the inner wall of the mold die cavity through partial or complete melting in the manner discussed subsequently.

In the process of the present invention, heat transfer from the substrate material through the resin-rich material layer is sufficiently rapid to provide that the resin-rich material layer is subjected to the elevated temperature for an interval shorter than the interval necessary to achieve thermal decomposition of the resin-rich material. In this manner, fusion between the material in the resinous layer and that of the underlying substrate material can be achieved. This unexpected feature permits the use of resin-rich material compositions with an associated underlying substrate materials that were heretofore believed to be incompatible. Materials can be employed as the resin-rich material layer which in the past were believed to decompose or be seriously degraded if even subjected to contact with molten substrate materials such as reinforced polymeric materials employed in the molded body.

Without being bound to any theory, it is believed that the resin-rich material experiences an initial rapid temperature rise over its melting point. The material in the resin-rich film tolerates the elevated temperature without appreciable decomposition due to the short contact duration. This tolerance is further enhanced because the injection of molten substrate into the closed environment of the mold die creates a transitory non-oxidative environment. The relatively large mass of the surrounding mold device provides a heat sink for the extreme temperature elevation that occurs upon introduction of the molten substrate. The heat rapidly passes through the resin-rich material layer, melting this material as it comes in contact with introduced substrate material. The short duration and the displacement of air from the mold prevents or minimizes the degradation of the resin-rich material.

It is further hypothesized that the rapid heating event which the resin-rich material layer experiences triggers a unique mechanical/chemical phenomenon in the polymeric matrix which is evidenced at the interface between the resin-rich material layer and the introduced molten substrate. It is not readily apparent what the exact mechanical and/or chemical characteristics of this interface are. In theory, it is believed that the instantaneous temperature elevation can initiate a transitory increase in reactivity of functional groups present in the resinous material with components present in the substrate. This theory is particularly compelling when the substrate is a thermoplastic material either with or without a reinforcing material such as glass. In instances in which the substrate is a more chemically inert material such as a metal, metal alloy, or the like, it is theorized that the interface has bonding characteristics which may be more mechanical in nature. However, it is believed that, even in the case of more inherently non-reactive substrates, the instantaneous temperature elevation event may contribute to increased adhesiveness of the resinous layer due to surface mixing when the resinous layer and substrate are both in the molten state.

It is also believed the introduced molten substrate contributes to a temporary increase in formability and increased elongation characteristics of the resin-rich material layer, which translates into more uniform distribution of the resin-rich material over the surface of the molded component. This occurs even in situations where that skin overlays a region of complex surface geometry such as gear teeth. This uniformity in coverage and thickness is not attainable by any other method.

Figure 2:
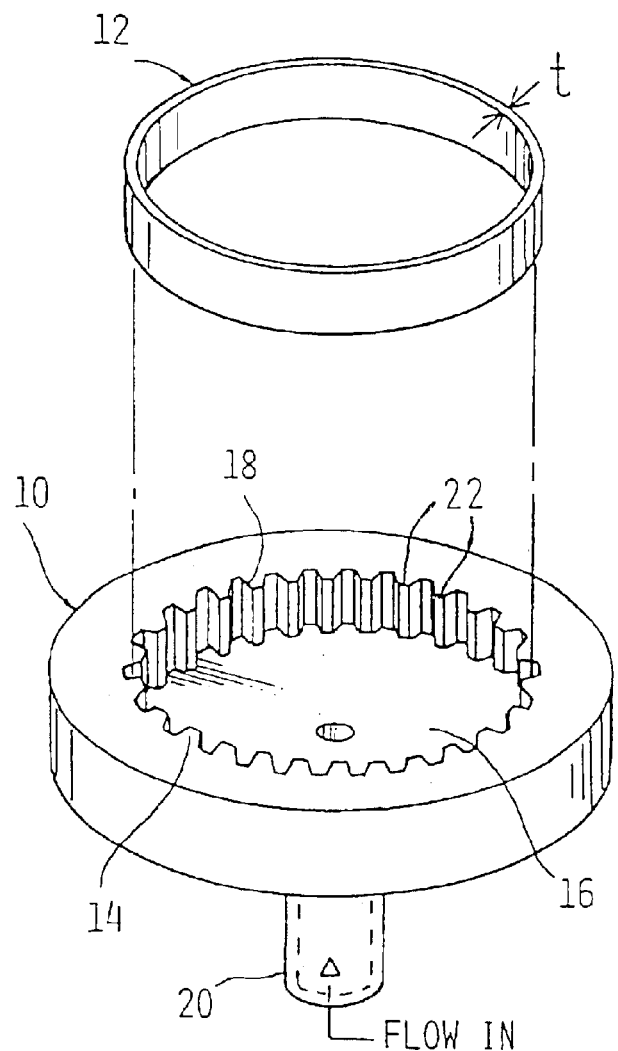
FIG. 2 is a perspective exploded view of a mold die and an acetal ring for the injection molding of a gear with a thermoplastic.

To further illustrate and explain the process of the present invention, reference is made to FIG. 2 in which the method is employed to produce a skinned gear sprocket 10 having a resin-rich skin.

A ring 12 of resin-rich material is positioned in the inner cavity 16 of a suitable mold body 14 in a manner which interposes the ring 12 between the inner surface 18 of the inner cavity 16 and the inlet 20 through which molten substrate material is introduced. The inlet 20 may be any suitable gated inlet used in a mold device as would be known in the field of injection molding. Generally, the inlet or inlets will be centrally positioned relative to the mold cavity 16 to insure even entrance and flow of the injectable material upon introduction.

The ring 12 may be produced by extrusion or other separate processing methods in any suitable manner to produce a ring structure of the desired thickness. Preferably, the ring 12 of resin-rich material will have an outer diameter essentially equal to the root diameter of the gear sprocket to be produced. Expansion of the ring 12 during processing is limited to the amount necessary to conform into the various gear teeth 22.

As set forth in the method of the present invention, the ring 12 of polymeric sheet material may have any suitable thickness capable of being molded and formed by the process of the present invention with a thickness t between about 0.001 inch and about 0.025 inch being generally employed and a thickness t between about 0.002 and about 0.01 inch being preferred. The material of choice may be any which will readily deform and mold under the process conditions described hereafter. Materials of choice generally have the good elongation and/or expansion characteristics. The resin-rich material of choice will be one having sufficient characteristics of elongation to deform to conform to the contours and geometry of the gear teeth 22. Suitable materials will support deformation by thinning without holes or voids developing in the sheet material. Preferably resin-rich materials having expansion characteristics between 30% and 350% are employed in the process of the present invention, with an expansion or elongation between 30% and 250% being most preferred.

Preferably, resin-rich materials having qualities enhancing wear and lubricity are preferred. Such materials include those from the group including at least one of acetal resins, fluorocarbon/acetal blends, polyether elastomers, and ethylene polymers including materials such as HDPE. Materials that can be employed in the process of the present invention for producing skinned gears can include the aforementioned materials.

For example, with an acetal resin having an expansion of 1.81 and a melt temperature of 175° C., a heat of fusion value of 134.6 J/gm and thermal conductivity (K) of 0.0231 J/sec cm$^2$ delta C is employed. In order to achieve a final depth of polymeric material equal to 0.25 millimeters, the initial polymeric sheet should have a thickness of approximately 0.5 mm. The defined area is 78.5 mm$^2$, with the volume being 746.1 mm$^3$ (7.8×9.5×10=vol). The total mass of the polymeric film is calculated at 1.052 gm (1.41 gm/cm$^2$×0.7461).

The amount of heat necessary to elevate the temperature of the ring from ambient (25° C.) to the latent melt temperature of 175° C. is calculated as 1.4654 J/gm×1.052 gm×150 or 321.2 J. Heat of fusion for the ring is calculated as 134.6×1.052 or 141.6 J. Additionally, the amount of energy necessary to heat the ring to 185° C. is 2.34 J/gm° C. ×1.052 gm×10 or 24.66 J. The total energy requirement to heat the ring to the desired deformation and elongation temperature is 397.5 J (=231.2+141.6+24.66).

In the situation as defined, the material will have a heat transfer rate (K delta T delta t)/cm of 11.98 degrees/sec (0.0231×150×(5)$^{-1}$×160/1000). The available heat introduced into the mold is calculated at 1.7166 g/cm per degree C×1.62×4.71×150° C. (based on a glass reinforced injection material having a specific heat of 1.10305 J/gm per degree solid and 1.7166 J/gm per degree at melt) for a total calculated value for available heat as 373 J.

The mass calculated volume of an associated gear mold is 6,721.12 cc (where $D_1$=50.04 and $D_2$=40.04 and H=9.5). The mass of the material required to fill this volume is 10.89 gm (based on 1.62×6.72112). The calculated value for available heat for the injectable material is 1.7166 J/gm degree C×10.89×(215−185) or 560.7 J, significantly greater than would be required to melt the polymeric ring 12.

Heat transfer in this application of the method of the present invention is calculated at 1455.0 J/sec which yields a melt time of 149 milliseconds for the acetal material.

Figure 3:
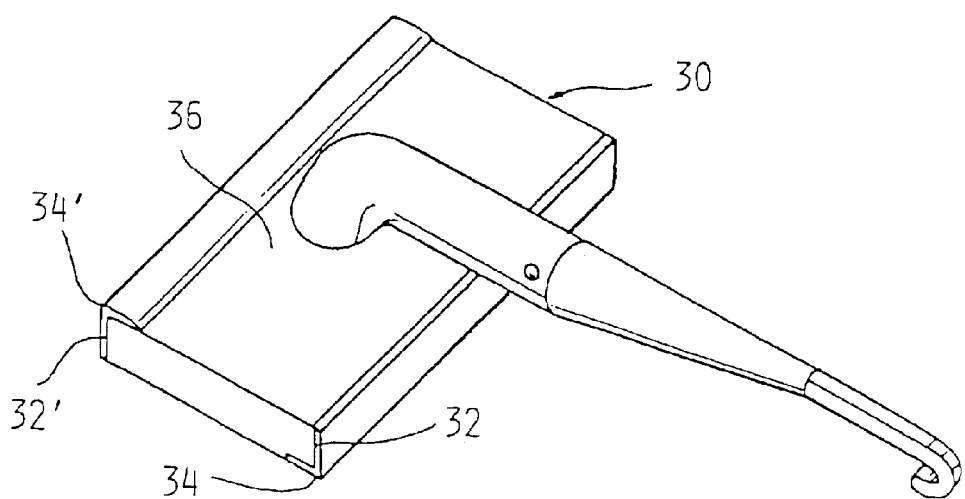
FIG. 3 is a perspective view of a wiper blade assembly produced by the process of the present invention where strips of polymeric material are bonded to the polymeric substrate assembly.

The method of the present invention may be successfully employed to produce other molded components such as a wiper assembly 30 with a strip of resin-rich material as shown in FIG. 3. There the strip of resin-rich material serves to reinforce and protect two corner edges 32 and 32'. The integrally placed material strips 34, 34' are bonded to a main body component 36 to reduce friction and wear in specified locations. The material of construction of the main body may be any suitable injectable material. An injectable material from the group that includes at least one of polyamides, acetal resins, injection moldable thermoplastic elastomers and polyetherimides is preferred. The injectable polymeric material may contain a suitable level of reinforcing material. In the preferred embodiment, the injectable polymeic material may contain up to 30% by weight of suitable reinforcing material. Suitable reinforcing material can be at least one from the group including glass or carbon fibers, KEVLAR, TEFLON, silicone materials and metal fibers with a range between about 5% and about 20% by weight being preferred. Typically, the preferred reinforcing material is glass and the preferred resin-rich material is an acetal resin.

Figure 4:
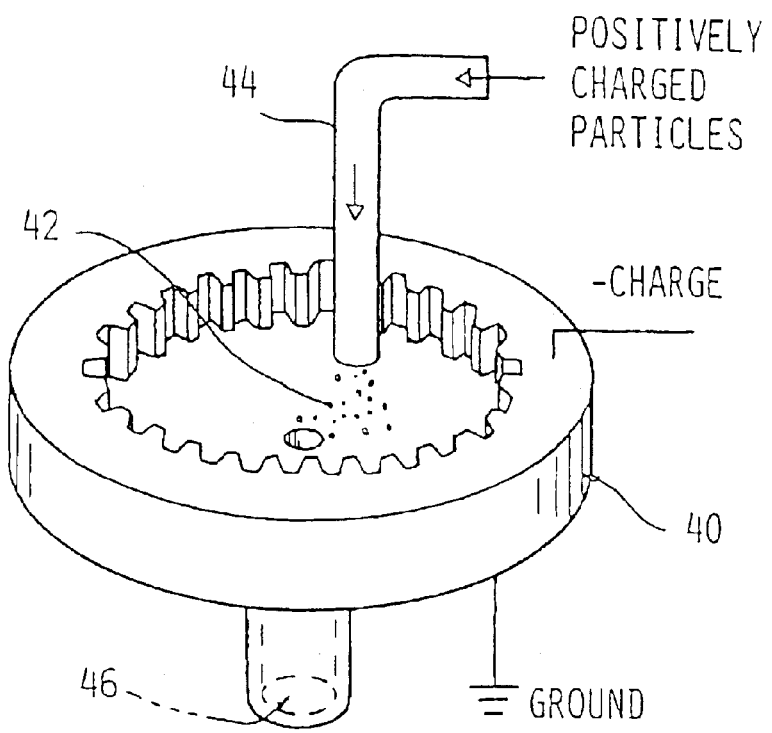
FIG. 4 is a perspective view of a mold die adapted for installation of a resinous material to the mold surface by electrostatic processes.

The process of the present invention may also be successfully employed using resin-rich material installed in the mold die by various methods. As shown in FIG. 4, a resin-rich material layer for ultimate use as the resin-rich skin on a gear can be installed through the application of an electrostatic charge to the mold and depositing charged particles of resinous material onto the mold.

As shown in FIG. 4, the gear mold 40 is electrically isolated and charged. Small particles 42 of resin-rich material are charged and fed into the mold via an injection port 44. The electrostatic forces attract the charged particles to the surface of the mold. The injection port moves axially and rotates to facilitate even distribution of particles on the gear mold. The process is continued until a desired thickness for the layer of resinous material is achieved. The thickness or depth of the resin-rich material is typically determined by the ultimate end use to which the part is to be placed. Typically, the depth or thickness of the resin-rich layer is preferably between 0.005 inch and 0.015 inch.

Generally, the particles which are deposited in the method of the present invention are up to about 100 microns nominal diameter with a minimum diameter limited primarily by handling and processing considerations. Typically, it is envisioned that the particle size will be greater than 10 microns. Preferably the particles employed will have a particle size between 20 and 60 microns, with a particle size between about 20 and 30 microns being preferred.

In order to achieve successful deposition of the polymeric particles on the surface of the mold, the mold may be electrostatically charged in any manner which will permit the adherence of the applied particles during subsequent molding operations. In the preferred embodiment, it has been found that a potential applied to the mold in the range of about 40 kilovolts and about 120 kilovolts can achieve suitable adherence, with a potential in a range between about 60 kilovolts and 100 kilovolts being preferred.

The mold is then closed and molten substrate material is injected into the mold via an injection port 46. The particles are trapped and melted as the injected substrate flows over the surface of the mold. As the mold is cooled, the material contained inside solidifies. The resin-rich particle material forms a bond with the material introduced as a molten substrate forming a thin skin of resinous material on the associated surfaces of the gear.

Figure 5:
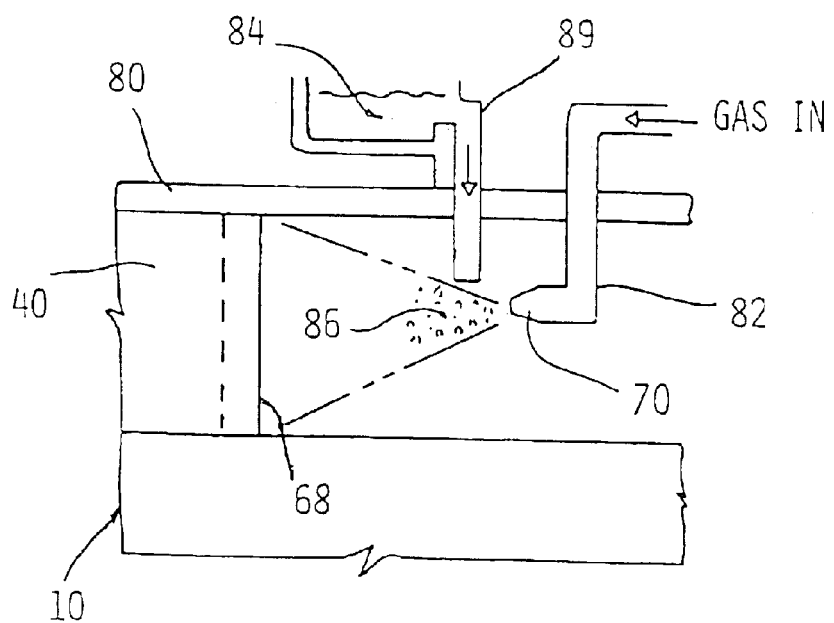
FIG. 5 is a schematic view directed to the application of a resinous material to the mold surface by spray application of hot molten particles.

It is also within the purview of this invention that the resin-rich material layer be applied as a spray particles as shown in FIG. 5. In this installation method, a plasma spray of particles of resin-rich material 86 is applied to the surface 68 of the mold 40. The particles are in the diameter range previously enumerated. In a plasma spray process as depicted herein, the particulate material is applied at elevated temperature. Preferably, the temperature of the particulate material is at a temperature which will permit attachment of the particles to the surface of the mold. The upper temperature limit is typically below the threshold of vaporization or where substantial thermal decomposition is initiated. Preferably, the particles are applied at a temperature equal or close to the melt temperature of the polymeric material of the particulate employed.

In the plasma spray application process, the spray is moved axially and rotated to coat the mold to the desired thickness, and creating a resin-rich material layer. The mold die is maintained at a temperature below the melting point of the applied plasma particles, such that the applied particles adhere to the mold and solidify upon impact on the surface of the mold die.

When the desired thickness of polymeric material is achieved, the spray nozzle is removed and the mold is closed. A molten substrate material is subsequently injected at a temperature sufficiently above the melting point of the resin-rich material layer to remelt the resin-rich material layer as the molten substrate comes into contact with the resin-rich material on the surface of the mold. After this, the molten substrate and the resinous layer continue to cool until both solidify into a solid molded device.

Another aspect of the hot spray technique is to use a fluidized bed of preheated, but unmelted particles 84 injected along path 89 into a hot gas stream 82 ejected by nozzle 70. The hot gas stream 82 is of sufficient temperature and contains sufficient heat to melt the particles as it carries the particles to the surface of the mold 40 through cover 80, which closes the mold 40. The hot carrying gas for carrying the particles preferably has a temperature close to the melt temperature of the particles to be injected as would be appropriate for the given application and material. The temperature may exceed the melt temperature range of the particles provided that the upper temperature limit is one which that will prevent substantial vaporization of the particles or initiate significant thermal decomposition of the polymeric material in the particles. By "significant thermal decomposition" it is contemplated that a degree of thermal decomposition may, in certain circumstances, be tolerable. However, the amount of thermal polymeric decomposition which occurs is an amount which that does not result in appreciable adverse effect on the performance of the polymeric material in the end use application.

In the preferred permutation of the plasma spray application method, the hot gas is a suitable gaseous material which is essentially non-reactive with the polymeric material to be applied. Suitable gaseous materials include, but are not limited to nitrogen, argon, helium and the like. It is also within the purview of the present invention to employ gaseous materials such as oxygen as the gas application medium.

While this invention has been described in terms of certain embodiments thereof, it is not intended that it be limited to the above description, but rather only to the extent set forth in the following claims.

What is claimed is:

1. A method of making a molded device having a resin-rich layer overlaying at least a portion of the outer layer of the device and integrally attached thereto, the method comprising the steps of:

installing a layer of resin-rich material within a mold die, the resin-rich material having a melting point, and the mold die having an interior surface and at least one contour defined therein;

introducing a volume of injectable moldable substrate into the mold die having the layer of resin-rich material installed therein, the injectable moldable substrate introduced into the mold die in an essentially molten state at a temperature above the melting point of the resin-rich material, the volume of injectable moldable substrate having sufficient heat to completely melt the resin-rich material installed in the mold die, the injectable moldable substrate introduced into the mold die such that the resin-rich material is interposed between the mold die and said injectable moldable substrate and is forced into contact with the interior surface of the mold die an the contour located therein in a manner which achieves substantially uniform bonding between the resin-rich material and the injectable moldable substrate immediately adjacent thereto along the entire area between the resin-rich material and the injectable moldable substrate;

permitting the resin-rich material and the injectable moldable substrate to cool to a temperature at which the substrate is in a substantially solid form.

2. The method of claim 1 where the layer of resin-rich material is a polymeric sheet.

3. The method of claim 2 wherein the thickness of the polymeric sheet is up to 0.025 inches.

4. The method of claim 1 where the application of a layer of resin-rich material comprises:

applying an electrostatic charge to the mold die; and spraying oppositely charged particles of the resin-rich material into the mold, such that the particles are attracted and distributed to the surface of the mold die.

5. The method of claim 4 wherein the particles of resin-rich material are from 10 microns to 100 microns.

6. The method of claim 4 wherein the electrical potential applied to the mold is from 40 kilovolts to 120 kilovolts.

7. The method of claim 1 where the application of a layer of resin-rich material comprises:

injecting particles of a polymeric material into a hot gas stream, at a temperature such that the particles either melt in the gas stream or are in a melted condition; and directing the hot gas stream of melted particles to the surface of the mold die.

8. The method of claim 7 wherein the particles of polymeric material are from 10 microns to 60 microns.

9. The method of claim 1 wherein the layer of resin-rich material is composed of a polymer including at least one of acetal resins, fluorocarbon/acetal blends, polyether elastomers, and ethylene polymers.

10. The method of claim 9 wherein the layer of resin-rich material contains high density polyethylene.

11. The method of claim 1 wherein the injectable moldable substrate is composed of a melt processible polymer containing at least one of polyamides, acetal resins, injection moldable thermoplastic elastomers and polyetherimides.

12. The method of claim 11 wherein the injectable moldable substrate further comprises a reinforcement additive.

13. The method of claim 12 wherein the reinforcement additive content is up to 30% by weight of the injectable material moldable substrate.

14. The method of claim 1 wherein the substrate has a melt temperature between about 200° C. and about 300° C.

15. A method of making a molded device having an external contact surface including a skin of resinous material in an overlying bonded relationship with an underlying support material comprising:

installing a layer of resin-rich material within a mold die, the resin-rich material having a melting point, and the die having an interior surface and at least one contour defined therein;

introducing an injectable moldable material in an essentially molten state into the interior of the mold die at a temperature above the melting point of the resin-rich material, wherein the injectable moldable material provides sufficient heat to melt the resin-rich material and forces the resin-rich material into contact with the interior surface of the mold die and the contour located therein, such that both the resin-rich material and the injectable moldable material are molten at the same time;

permitting the resin-rich material and the injectable moldable material to cool to solidify the resin-rich material and the injectable moldable material creating an essentially permanent bond between the resin-rich material and the injectable moldable material along the entire area between the resin-rich material and the injectable moldable substrate thus forming the molded device with a resin-rich skin.

16. The method of claim 15 where the layer is a polymeric sheet, a layer of particles sprayed onto the mold die surface, or a layer of particles electrostatically deposited on the mold die surface.

17. The method of claim 15 wherein the layer of resin-rich material is composed of a polymer containing at least one of acetal resins, fluorocarbon/acetal blends, polyether elastomers, polyamides and ethylene polymers.

18. The method of claim 15 wherein the injectable moldable material is a melt processable polymer containing at least one of polyamides, acetal resins, injection moldable thermoplastic elastomers and polyetherimides.

19. The method of claim 18 wherein the injectable material further comprises a reinforcement additive.

20. A method of making a molded device having a skin of resinous material comprising:

installing a layer of resin-rich material within a mold die, the resin-rich material having a melting point, and the die having an interior surface and at least one contour defined therein;

introducing a volume of injectable moldable substrate into the mold die, the injectable moldable substrate being in an essentially molten state at a temperature above the melting point of the resin-rich material, the volume of injectable moldable substrate having sufficient heat to melt the resin-rich material installed in the mold die, the volume of injectable moldable substrate introduced the mold die such that the resin-rich material is between the mold die and said injectable moldable substrate, such that heat to melt the resin-rich material is conveyed from the molten substrate through the resin-rich material, and such that the resin-rich material and the injectable moldable material are molten at the same time;

forcing the resin-rich material into contact with the interior surface of the mold die and the contour located therein in a manner which achieves substantially uniform bonding between the resin-rich material and the injectable moldable substrate immediately adjacent thereto along the entire area between the resin-rich material and the injectable moldable substrate;

permitting the resin-rich material and the injectable moldable substrate to cool, whereby the heat is conveyed through the mold die, to a temperature at which the substrate is in a substantially solid form, and creating an essentially permanent bond between the resin-rich material and the injectable moldable material thus forming the molded device with a resin-rich skin.

21. The method of claim 20 where the layer is a polymeric sheet, a layer of particles sprayed onto the mold die surface, or a layer of particles electrostatically deposited on the mold die surface.

22. The method of claim 20 wherein the layer of resin-rich material is composed of a polymer containing at least one of acetal resins, fluorocarbon/acetal blends, polyether elastomers, polyamides and ethylene polymers.

23. The method of claim 20 wherein the injectable moldable substrate is a melt processable polymer containing at lest one of polyamides, acetal resins, injection moldable thermoplastic elastomers and polyimides.

24. The method of claim 23 wherein the injectable moldable substrate further comprises a reinforcement additive.

* * * * *